United States Patent [19]
Knight

[11] 4,102,356
[45] Jul. 25, 1978

[54] DRY-BREAK COUPLER

[75] Inventor: Houston W. Knight, Whittier, Calif.

[73] Assignee: FMC Corporation, San Jose, Calif.

[21] Appl. No.: 801,719

[22] Filed: May 31, 1977

[51] Int. Cl.$^2$ .......................... F16L 29/00; F16L 37/28
[52] U.S. Cl. .............................. 137/614.06; 251/149.9
[58] Field of Search ................ 137/614.06; 251/149.9; 285/320

[56] References Cited
U.S. PATENT DOCUMENTS

| 2,872,216 | 2/1959 | Kaiser | 251/102 X |
| 4,030,524 | 6/1977 | McMath et al. | 251/149.9 |

Primary Examiner—Martin P. Schwadron
Assistant Examiner—A. Michael Chambers
Attorney, Agent, or Firm—W. W. Ritt, Jr.; J. W. Edwards; C. E. Tripp

[57] ABSTRACT

A dry-break coupler, of the type used on a gasoline tank truck loading arm, is connectable with a standard A.P.I. adapter, that is located near the bottom of a truck tank, for loading fluid into the tank. The coupler and the adapter can be connected together or they can be separated, without the loss of fluid, while both fittings are continuously subjected to internal fluid pressure. The coupler has a tubular body that defines a central flow passage. Located within the tubular body is a movable valve closure element. This element opens and closes the flow passage of the coupler, and it also actuates a central valve of an adjacent adapter. An adapter latch and a first rotatable shaft that operates the adapter latch are pivotally mounted on the tubular body. A second rotatable shaft that operates the valve closure element is mounted within the tubular body. Portions of both the first and second rotatable shafts extend in substantially parallel relationship. Mounted on the shafts is a shaft interlocking mechanism that prevents rotation of the second rotatable shaft, to open the flow passage to the adapter, without first moving the adapter latch to a locked position. The shaft interlocking mechanism also prevents rotation of the first rotatable shaft, to release the adapter latch from the adapter, when the valve closure element is in a position with the flow passage open.

12 Claims, 10 Drawing Figures

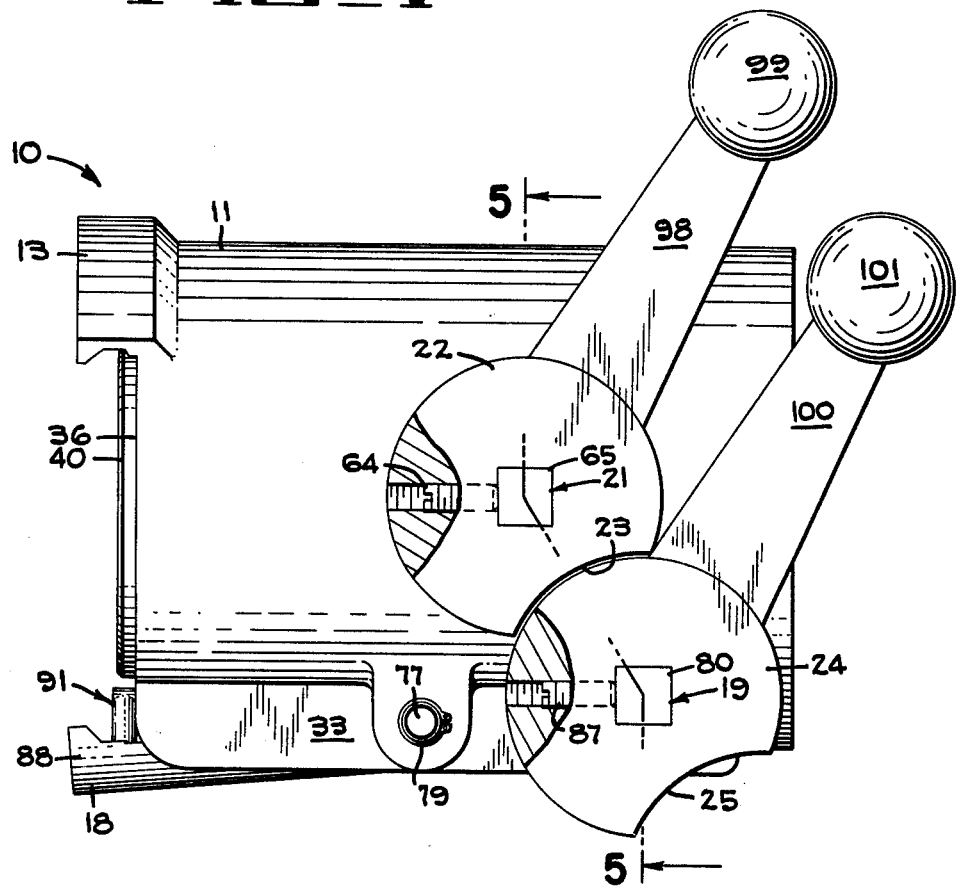
FIG_1
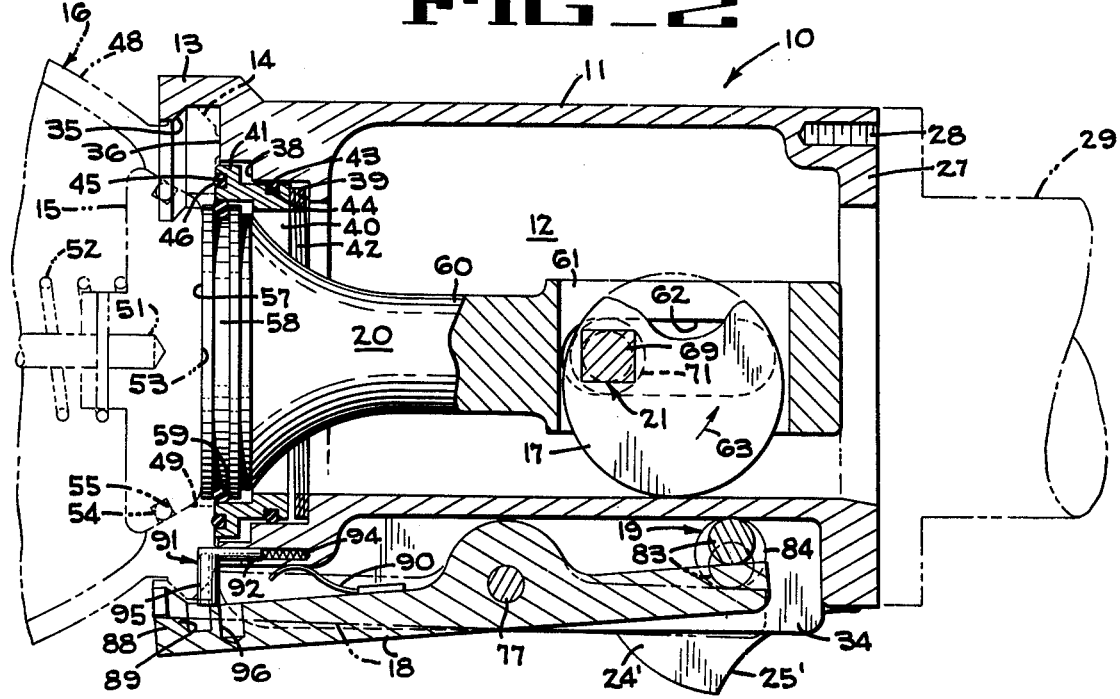
FIG_2

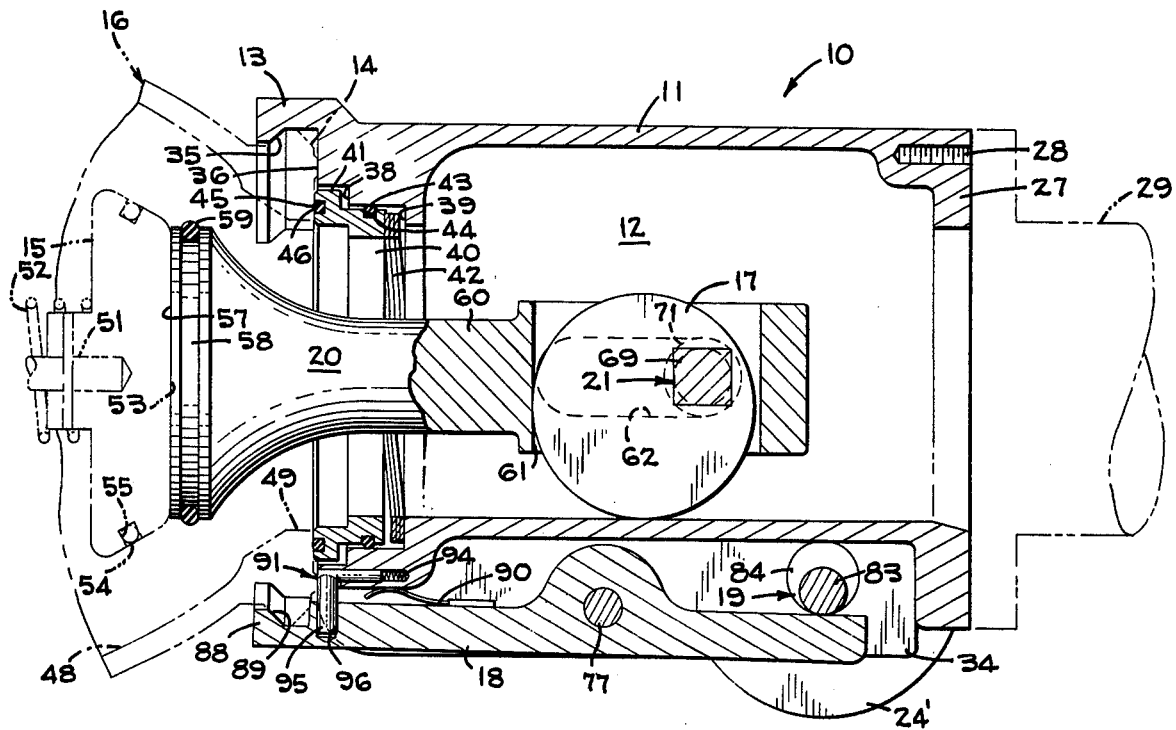
FIG_3
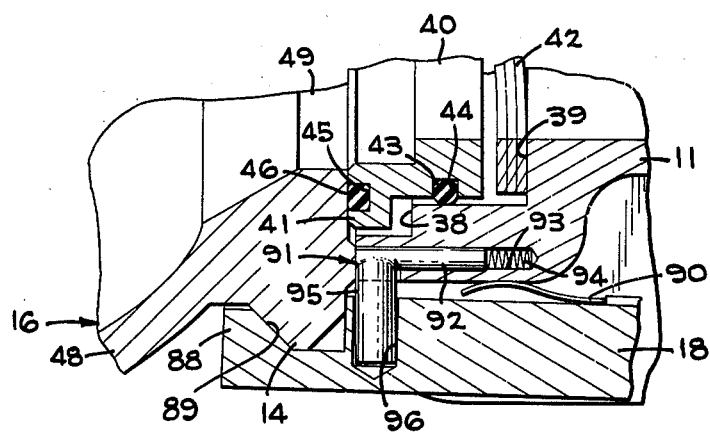
FIG_4

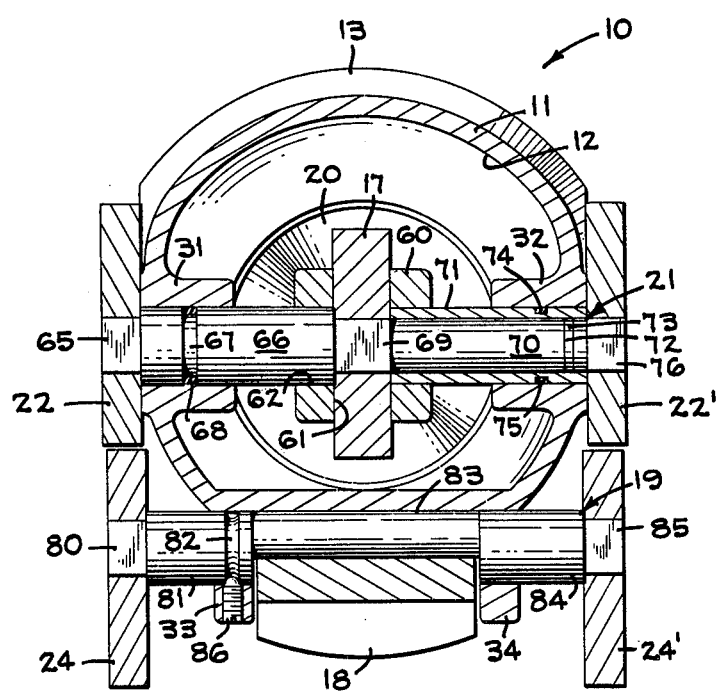
FIG_5

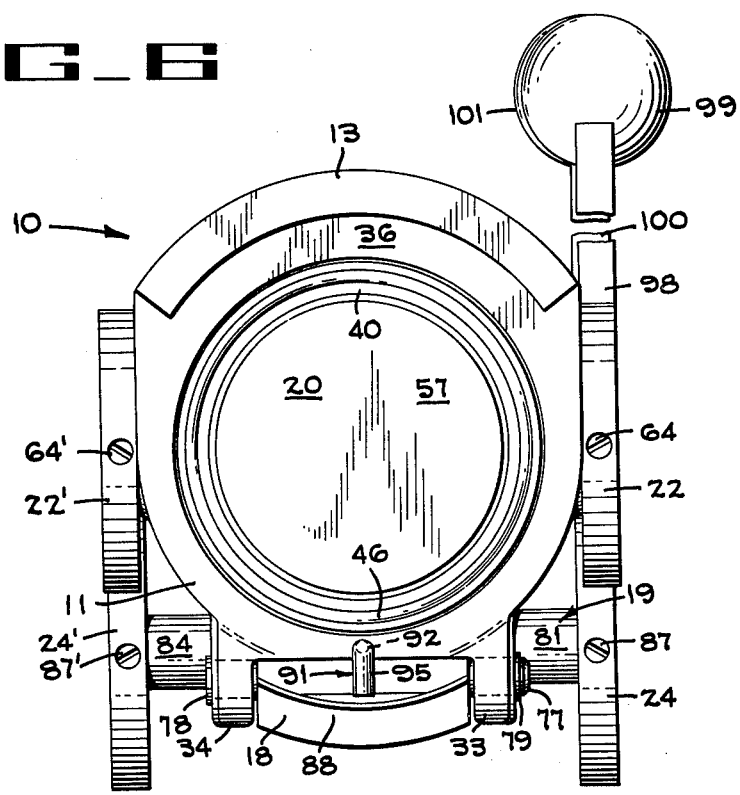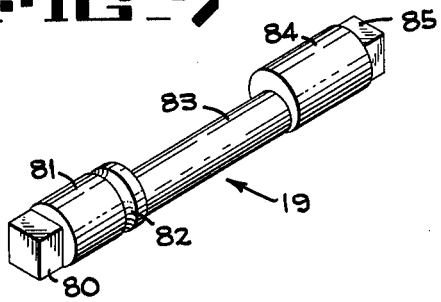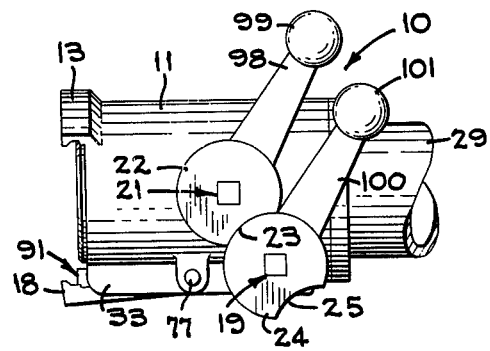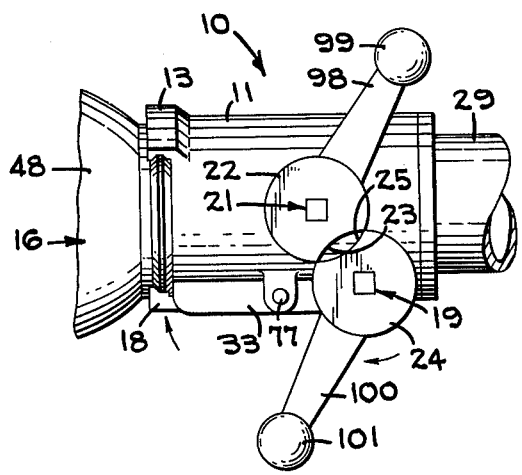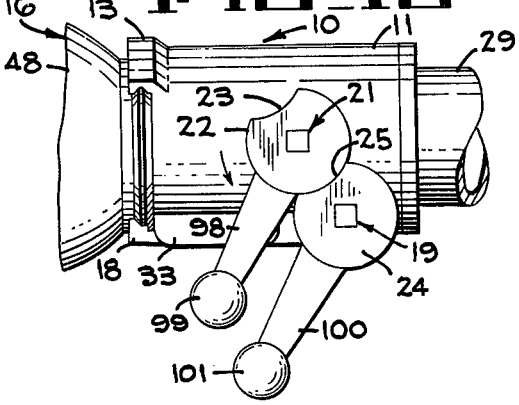

DRY-BREAK COUPLER

BACKGROUND OF THE INVENTION

1. Field of the Invention

This invention relates to a dry-break coupler that can be connected in series with a valved adapter to define a flow passage for fluid. Upon separation, internal valves within both the coupler and the adapter block fluid flow therein towards the opposite member.

2. Description of the Prior Art

Known dry-break couplers have internal valves for regulating fluid flow and external couplings for attachment to adapters. Controls are required for operating both the valves and the couplings. It is necessary for an operator to hold the coupler in a position for coupling with the adapter, then operate the controls both for latching the coupler to the adapter and for opening the valve to allow fluid to flow from the coupler into the adapter. These operations can be difficult to perform by a single operator, since they require the use of both of the operator's hands to operate the controls. Often the operator uses his body to hold the coupler in position with the adapter, while he operates the controls with his hands. Should the operator inadvertently open the valve before the coupler is latched to the adapter or should he unlatch the coupler before the valve is closed to block the flow of fluid, an accident would result, unless safety control features were provided to prevent such action.

Dry-break couplers having internal valves for preventing the loss of fluid from an uncoupled coupler are shown in U.S. Pat. Nos. 3,473,569; 3,474,827; 3,884,448; and 3,897,091. Cams for operating valve closure elements are shown in U.S. Pat. Nos. 806,970 and 2,662,721. A coupling latch with a pivotable pawl that is controlled by a double pivotally connected handle is disclosed in U.S. Pat. No. 3,897,091. An interlocking mechanism that includes a disc with two arcuate cutouts, on diametrically opposite sides of the disc periphery, for receiving cylindrical members is shown in U.S. Pat. No. 3,693,655.

In view of the prior art, there remains a need for a dry-break coupler that is light in weight, that can be readily handled, that can be operated by one hand of an operator with the same hand performing both the coupler latching operation and valve opening operation, that has safety features to prevent inadvertent operations by the operator resulting in accidental loss of fluid, that has a simple guide system for the valve closure element to prevent such element from binding, and that has a simple clamping mechanism for latching the coupler to an adapter.

SUMMARY OF THE INVENTION

A dry-break coupler has a tubular body that defines a central flow passage. An adapter latch and a first rotatable shaft are pivotally mounted on the tubular body. Located within the tubular body is a movable valve closure element that opens and closes the flow passage of the coupler. This element also actuates a central valve of an adjacent adapter that is aligned in series with the central flow passage of the coupler. A second rotatable shaft is mounted within the tubular body for operating the movable valve closure element. Portions of the first and second rotatable shafts extend in substantially parallel relationship. Mounted upon the rotatable shafts is shaft interlocking means that prevents rotation of the second rotatable shaft, to open the flow passage to the adapter, without first moving the adapter latch to a locked position. The shaft interlocking means also prevents rotation of the first rotatable shaft, to release the adapter latch from the adapter, when the valve closure element is in a position with the flow passage open.

BRIEF DESCRIPTION OF THE DRAWING

FIG. 1 is a side view of a dry-break coupler embodying the present invention.

FIG. 2 is a longitudinal section of the coupler shown in FIG. 1, with the coupler connected at one end to the coupling flange of a loading arm and positioned in unlocked engagement with an adapter at the opposite end.

FIG. 3 is a section similar to FIG. 2, except that the coupler and the adapter are shown locked together.

FIG. 4 is an enlarged detail view of a gib head plunger.

FIG. 5 is a section taken on line 5—5 of FIG. 1.

FIG. 6 is a front view of the coupler shown in FIG. 1.

FIG. 7 is a perspective view of a first rotatable shaft for operating an adapter latch.

FIGS. 8–10 are operational views of the coupler shown in FIG. 1.

DESCRIPTION OF THE PREFERRED EMBODIMENT

With reference to FIGS. 1–3, a dry-break coupler 10 has a tubular body 11 that defines an internal flow passage 12. At one end of the tubular body is an arcuate catch 13 for engaging an annular locking rib 14 that surrounds a central valve 15 of an adapter 16. This adapter conforms with the standards of the American Petroleum Institute Recommended Practice 1004. Pivotally mounted upon the tubular body is an adapter latch 18 for locking the adapter in sealed contact with the coupler so that the central valve of the adapter is aligned in series with the internal flow passage of the coupler. The adapter latch is operated by a first rotatable shaft 19 that is mounted on the tubular body. Within the tubular body is a movable valve closure element 20 for both opening and closing the flow passage and for actuating the central valve of the adapter. This element is operated by a valve control cam 17 that is eccentrically mounted on a second rotatable shaft 21 within the tubular body. Portions of the shafts 19 and 21 extend in substantially parallel relationship, and at least one location outside the tubular body, shaft interlocking means is mounted upon the shafts. Preferably such means is mounted at each end of each shaft to provide symmetrical loading thereon.

The shaft interlocking means includes discs 22 and 22' on the shaft 21 and discs 24 and 24' on the shaft 19. These discs extend radially in substantially the same plane when mounted on the shafts. An arcuate notch 23 is provided in the disc 22 and an arcuate notch 25 is provided in the disc 24. These notches correspond to an overlapping of the disc peripheries where one disc intersects the other. A disc is rotatable when positioned within the arcuate notch portion removed from the other disc, but the disc is locked against rotation when the other disc is positioned within the arcuate notch portion removed from the locked disc. Thus, the shaft interlocking means prevents rotation of the first rotatable shaft 19 to release the adapter latch 18 from the adapter when the valve closure element 20 is in a position with the flow passage 12 open and prevents rotation of the second rotatable shaft 21 as to open the flow passage to the adapter 16 without first moving the adapter latch to a locked position. It will be understood that corresponding discs 22' and 24' have corresponding notches 23' and 25', respectively, only the notch 25' of disc 24' being shown in FIG. 2.

Looking now at FIGS. 2 and 3, at one end of the tubular body 11 is a flange 27 that is provided with bolt openings 28. These openings are located on a bolt circle corresponding with the Tank Truck Manufacturers Association Standards. The dry-break coupler 10 can be attached to a gasoline tank truck loading arm 29 by bolts fitting into the bolt openings 28.

With reference to FIG. 5, a pair of center bored bosses 31 and 32 project laterally inward of the tubular body 11 for mounting the shaft 21. Projecting outwardly from the tubular body are a pair of mounting flanges 33 and 34 that support the shaft 19 that actuates the adapter latch 18. As shown in FIG. 6, the arcuate catch 13 projects radially inward of the tubular body at a location diametrically opposite from the adapter latch for engaging the adapter 16. This catch has an axially inclined bearing surface 35, shown in FIGS. 2 and 3, for engaging the annular locking rib 14 of the adapter and thereby holding the adapter in contact with an end face 36 of the tubular body.

Within the tubular body 11, near the end face 36, the central bore is stepped to provide a first radial surface 38 and a second radial surface 39. A retainer or nose piece 40 fits within the central bore near the radial surfaces. This nose piece has a radial flange 41 that is positioned opposite the surface 38. An annular wave-spring 42 seats upon the surface 39, and bears against the adjacent end of the nose piece. This spring normally holds the nose piece in a position with the flange 41 spaced outwardly from the surface 38. An O-ring seal 43 fits within a groove 44 in the nose piece for contacting the interior surface of the tubular body 11 between the surfaces 38 and 39. A groove 45 is provided in the nose piece radial end face that is located adjacent the end face 36 of the tubular body. An O-ring seal 46 projects outwardly from the groove 45 to contact the end face of the adapter 16.

The adapter 16 has a valve housing 48 with a central opening 49 that is closed by the poppet-type central valve 15. This valve has a stem 51 that is slidably fitted within a guide, not shown. A compression spring 52 is mounted about the stem, between the guide and the valve, to urge the valve towards a position in sealed engagement with the valve housing. This valve is actuated by the movable valve closure element 20 of the coupler 10. The central valve has an end face 53 that abuts the valve closure element. An O-ring seal 54, that is seated within a peripheral groove 55 in the valve, contacts the inner surface of the housing 48 about the central opening. The annular locking rib 14 projects radially outward of the housing opposite the central opening.

The movable valve closure element 20 has an end face 57 that abuts the end face 53 of the adapter poppet valve 15. A peripheral groove 58 is provided about the valve closure element near the end face. An O-ring seal 59 projects outwardly from this peripheral groove to contact an inner surface of the nose piece 40 when the valve closure element is in a closed position, as shown in FIG. 2. This valve closure element has a stem portion 60 that is provided with a cam receiving slot 61 and a shaft receiving slot 62 that extends transversely of each other. The second rotatable shaft 21 fits through both the slot 62 and the valve control cam 17. This cam fits within the slot 61 for moving the central valve closure element 20. When the valve closure element is in a closed position, as shown in FIG. 2, the cam contacts the tubular body 11 to lock the closure element in place. Upon counterclockwise shaft rotation, as indicated by the arrow 63, the cam engages the stem portion 60 at the forward end of the slot 61 to move the valve closure element forward to a locked open position, as shown in FIG. 3, with the cam contacting the tubular body. Shaft rotation in the opposite direction causes the cam to engage the stem portion at the rear end of the slot 61 to return the valve closure element backward towards the locked closed position, shown in FIG. 2.

The shaft 21 is journalled within the center bore bosses 31 and 32 that project inwardly of the tubular body 11. This shaft has a variety of cross-sectional configurations, as shown in FIG. 5. A shaft portion 65, that projects outwardly from the tubular body, has a square cross-section. The disc 22 fits on the shaft portion 65 where it is held in place by a set screw 64, as shown in FIGS. 1 and 6. Extending inwardly from the shaft portion 65 through the boss 31 is a shaft portion 66 that generally has an enlarged circular cross-section. This shaft portion is provided with a peripheral groove 67 for receiving an O-ring seal 68. A mid-portion 69 of the shaft has a square cross-section that fits within a similarly-shaped opening in the valve control cam 17. Extending outwardly from the shaft mid-portion through the boss 32 is a shaft portion 70 that has a circular cross-section of reduced diameter. A sleeve 71 fits about the shaft portion 70 to provide an outside diameter equal to that of the shaft portion 66. A peripheral groove 72 and an O-ring seal 73 are provided between the shaft portion 70 and the sleeve. A peripheral groove 74 and an O-ring seal 75 are provided between the sleeve and the boss 32. A shaft portion 76, that projects outwardly from the tubular body, has a square cross-section, and the disc 22' fits thereon where it is held in place by a set screw 64' as shown in FIG. 6.

The shaft 21 guides the stem portion 60 of the movable valve closure element 15 as this element moves within the tubular body 11. The outside diameter of the shaft portion 66 and the sleeve 71 is approximately the same dimension as the height of the slot 62. Thus, the stem portion is maintained in a centered position about the shaft as the stem portion moves transversely thereon. The opposite end of the valve closure element is held in a centered, closed position by the nose piece 40. This end is also held in a centered, open position by the central valve 15 which bears axially against the end of the valve closure element.

Looking now at FIG. 7, the first rotatable shaft 19 has an end portion 80 with a square cross-section. A generally cylindrical portion 81, having a radially peripheral groove 82, extends inwardly from the end portion to an eccentric portion 83. This eccentric portion has a circular cross-section of smaller diameter than the cylindrical portion, and the axes of these portions are offset radially in a crank-like manner. A cylindrical portion 84, having its axis aligned on the extension of the axis of the generally cylindrical portion 81, extends outwardly from the eccentric portion to a square end portion 85. With reference to FIG. 5, the cylindrical portions 81 and 84 are journalled within bearing openings in the mounting flanges 33 and 34. A set screw 86, that is mounted in the flange 33, projects into the groove 82 to lock the shaft axially in place. The disc 24 fits upon the shaft end portion 80. This disc is locked in place on the shaft by a set screw 87, shown in FIGS. 1 and 6. Similarly, the disc 24' fits upon the shaft portion 85 where it is locked in place by a set screw 87', as shown in FIG. 6.

The adapter latch 18 is pivotally mounted, as shown in FIGS. 1, 2 and 6, upon a pin 77 that extends through openings in both the mounting flanges 33 and 34 and the latch therebetween. The pin is retained axially in place by a head portion 78 that bears against the mounting flange 34 and by a spring retainer clip 79 that fits about the end of the pin opposite from the head portion to bear against the mounting flange 33. The pin extends transversely through the mid-portion of the adapter latch. One end of the adapter latch is aligned for engagement with the eccentric portion 83 of the first rotatable shaft 19. Rotation of this shaft causes the eccentric portion to move inwardly or outwardly from the tubular body 11 and thereby pivot the adapter latch.

At the end of the adapter latch 18, opposite from the end that engages the shaft eccentric portion 83, is a flange 88 having an arcuate transverse shape, as shown in FIG. 6. This flange has an axially inclined surface 89, as shown in FIGS. 2 and 3, for bearing against the back side of the annular locking rib 14. Pivotal movement of the latch towards the adapter 16 forces the adapter end face into sealing engagement with the O-ring seal 46. The diametrically opposite side of the annular locking rib is forced against the axially inclined bearing surface 35 of the arcuate catch 13. Thus, the adapter latch locks the dry-break coupler 10 in fluid tight sealing engagement with the adapter 16.

The adapter latch 18 is urged towards an unlatched position by a spring 90 that has one end mounted upon the adapter latch, near the flange end 88, and an opposite end slidably bearing against the tubular body 11. Thus, when the eccentric portion 83 of the shaft 19 rotates from the phantom line position shown in FIG. 2, to the position shown in solid line close to the tubular body, the spring forces the adapter latch flange end outwardly from a latched position. The opposite end of the adapter latch pivots inwardly to maintain engagement with the eccentric portion of the shaft.

Looking again at FIG. 2, an adapter latch lock 91 holds the adapter latch 18 in an unlatched or open position until the lock is depressed by an adjacent adapter that is in a position to be locked in sealed contact with the coupler, as shown in FIG. 3. Shown in detail in FIG. 4, the lock 91 includes a plunger 92 that is slidably fitted within a bore 93 in the tubular body 11. The plunger is urged outwardly of the bore by a spring 94 that is positioned between the inner ends of the plunger and the bore. A gib head 95 projects perpendicularly from the plunger toward the adapter latch. This gib head is normally held, by the spring bearing against the plunger, at a location for contact with the adapter, that depresses the plunger within the bore in the tubular body. The adapter latch has a bore 96 for receiving the gib head, thereby enabling the latch to close when the plunger is depressed by the adapter. When the plunger is extended from the bore 93, the gib head engages the adapter latch adjacent the bore 96 to prevent closing the adapter latch.

Looking again at FIG. 1, the shaft control disc 22 has an operating handle 98 extending therefrom with a control knob 99 at the distal end. Extending from the shaft control disc 24 is an operating handle 100 that has a control knob 101. These operating handles provide leverage for an operator to rotate the shafts 19 and 21. The shaft interlocking means, that include discs 22, 22', 24, and 24', prevents the operator from moving the handles to rotate the shafts in an improper sequential manner.

OPERATION

Before attachment to the adapter 16, the dry-break coupler 10 is positioned, as shown in FIG. 8, with the operating handles 98 and 100 extending in the same direction away from the open adapter latch 18. The disc 24 is positioned within the arcuate notch 23 of the disc 22, thereby locking the latter disc against rotation. The movable valve closure element 20, that is located within the coupler, is closed, blocking the flow passage 12. The coupler is positioned with the arcuate catch 13 fitting about the annular locking rib 14 of the adapter, as shown in FIG. 9. Then, the handle 100 is pivoted towards the adapter latch, in a clockwise direction as viewed in FIG. 9, rotating the disc 24 out of the arcuate notch 23, to a position where the arcuate notch 25 is aligned with the outer periphery of the disc 22. Rotation of the shaft 19 causes the eccentric portion 83 to pivot the adapter latch 18 to a position where the flange 88 engages the annular locking rib, holding the coupler in fluid sealing engagement with the adapter.

Now, the operating handle 98 is rotated in a counter-clockwise direction, as viewed in FIG. 10. Rotation of shaft 21 causes the valve control cam 17, within the coupler 10, to rotate and force the movable valve closure element 20 forward towards the open flow passage position, shown in FIG. 3. At this time, both operating handles 98 and 100 extend, in the same direction, towards the adapter latch, and fluid is transferred from the dry-break coupler 10 to the adapter 16.

When the operator desires to shut-off the fluid flow, he rotates the operating handle 98 in a clockwise direction to the position shown in FIG. 9. To unlatch the adapter 16, the operator rotates the handle 100 in a counter-clockwise direction to the position shown in FIG. 8.

From the foregoing description, it will be seen that the dry-break coupler 10 can be readily handled by an operator. Only one hand is required to move the two operating handles 98 and 100, since these handles move sequentially, for both latching the coupler to an adapter 16 and for opening the flow passage 12. Safety features are provided to prevent inadvertent operations that could result in an accidental loss of fluid. A simple guide system is provided to prevent the valve closure element from binding. The coupler is latched to the adapter by a simple clamping mechanism.

Although the best mode contemplated for carrying out the present invention has been herein shown and described, it will be apparent that modification and variation may be made without departing from what is regarded to be the subject matter of the invention.

What is claimed is:

1. A dry-break coupler for attachment to an adapter that has an annular locking rib surrounding a central valve, said coupler comprising a tubular body that defines a central flow passage, an adapter latch that is pivotally mounted on the tubular body for locking the adapter in sealed contact with the coupler so that the central valve of the adapter is aligned in series with the central flow passage of the coupler, a first rotatable shaft that is mounted upon the tubular body for operating the adapter latch, a movable valve closure element that is located within the tubular body for both opening and closing the flow passage and for actuating the valved adapter, a second rotatable shaft that extends through the tubular body for operating the movable valve closure element, said first and second rotatable shafts having portions that extend in substantially parallel relationship, and interlocking means mounted upon said rotatable shafts to prevent rotation of the second rotatable shaft as to open the flow passage to the adapter without first moving the adapter latch to a locked position, said interlocking means preventing rotation of the first rotatable shaft to release the coupler adapter latch from the adapter when the valve closure element is in a position with the flow passage open.

2. A dry-break coupler as described in claim 1, wherein said shaft interlocking means include a first disc that is mounted upon the first rotatable shaft, and a second disc that is mounted upon the second rotatable shaft, said discs extending diametrically in substantially the same plane outside of the tubular body, said discs having a generally circular shape with an arcuate notch portion removed from each disc periphery in one position where the discs tend to intersect, each of said discs being rotatable when positioned within the arcuate notch portion removed from the other disc, each of said discs being interlocked when the other disc is positioned within the arcuate notch portion removed therefrom.

3. A dry-break coupler as described in claim 1 wherein the adapter latch has a hook portion at one end thereof for engaging the annular locking rib of the adapter.

4. A dry-break coupler as described in claim 3 wherein the first rotatable shaft has an eccentric portion that engages the adapter latch at a location that is spaced from the position where the adapter latch is pivotally mounted on the tubular body for pivoting the adapter latch upon rotation of the first rotatable shaft.

5. A dry-break coupler as described in claim 3 further including a catch that is fixed to the tubular body in a position diametrically opposite from the hook portion of the adapter latch for engaging the annular locking rib of the adapter, said adapter latch hook portion having an inclined surface to wedge the radial coupling flange of the adapter in place between the catch and the tubular body.

6. A dry-break coupler as described in claim 1 wherein the second rotatable shaft has a valve control cam mounted thereon within the tubular body, said valve closure element having a slot therein for receiving the valve control cam, said valve closure element having a pair of slots therein for receiving the second rotatable shaft, whereupon rotation of the second rotatable shaft in one direction causes the valve control cam to force the valve closure element towards an open position while rotation of the second rotatable shaft in the opposite direction causes the valve control cam to force the valve closure element towards a closed position.

7. A dry-break coupler as described in claim 6, further including a nose piece that is fitted within the tubular body about the flow passage said nose piece supporting one end of the valve closure element when the valve closure element is in a closed position, the opposite end of the valve closure element being supported by the second rotatable shaft.

8. A dry-break coupler as described in claim 7 wherein said valve closure element when in an open position is spaced from said nose piece by a spacing that provides an unobstructed flow passage between the valve closure element and the nose piece, said valve closure element being supported at one end by both the valve control cam and the second rotatable shaft, the opposite end of the valve closure element being supported in a direction axially of the valve closure element towards the cam by the central valve in the adapter.

9. A dry-break coupler as described in claim 1 further including an adapter latch lock for holding the adapter latch in an open position until the adapter latch lock is depressed, said adapter latch lock being positioned to be depressed by an adjacent adapter that is located for locking by the adapter latch in sealed contact with the coupler.

10. A dry-break coupler as described in claim 1 further including a spring that is positioned between the adapter latch and the tubular body to resiliently urge the adapter latch away from locking engagement with the adapter.

11. A dry-break coupler as described in claim 1 further including a spring loaded plunger that is slidably fitted within the tubular body, and a gib head that projects from the plunger towards the adapter latch in a position to be contacted by the adapter for depressing the plunger, said adapter latch having a bore therein for receiving the gib head of the plunger when the plunger is depressed by the adapter, said gib head engaging the adapter latch adjacent the bore when the plunger is in an extended position to prevent moving the adapter latch to a locked position.

12. A dry break coupler as described in claim 1 wherein the second rotatable shaft has a valve control cam mounted thereon within the tubular body, said valve closure element having a slot therein for receiving the valve control cam, said valve closure element having a pair of slots therein for receiving the second rotatable shaft, said valve control cam forcing the valve closure element upon rotation of the second rotatable shaft in one direction towards an open position and in an opposite direction towards a closed position, said valve control cam being eccentrically mounted upon the second rotatable shaft to contact the tubular body in both the open position and the closed position, thereby locking the valve closure element in the desired positions.

* * * * *